United States Patent [19]
McCarty

[11] 4,444,923
[45] Apr. 24, 1984

[54] PROCESS FOR PREPARING AQUEOUS COATINGS COMPRISING DISPERSIBLE EPOXY RESIN-ACID POLYMER ESTER

[75] Inventor: William H. McCarty, Whitehouse Station, N.J.

[73] Assignee: Mobil Oil Corporation, New York, N.Y.

[21] Appl. No.: 454,817

[22] Filed: Dec. 30, 1982

[51] Int. Cl.$^3$ .............................................. C09D 3/58
[52] U.S. Cl. ..................... 523/406; 523/100; 523/407; 523/408; 523/409; 523/412; 523/423; 525/63; 525/65; 525/107; 525/108; 525/112
[58] Field of Search ............... 523/100, 406, 407, 408, 523/409, 412, 423; 525/63, 65, 107, 108, 112

[56] References Cited

U.S. PATENT DOCUMENTS

| | | | |
|---|---|---|---|
| 2,954,358 | 9/1960 | Hurwitz | 523/409 |
| 4,029,620 | 6/1977 | Chen | 523/409 |
| 4,212,781 | 7/1980 | Evans et al. | 523/404 |
| 4,247,439 | 1/1981 | Matthews et al. | 523/409 |
| 4,285,847 | 8/1981 | Ting | 525/63 |
| 4,302,373 | 11/1981 | Steinmetz | 523/409 |
| 4,308,185 | 12/1981 | Evans et al. | 525/63 |
| 4,341,682 | 7/1982 | Tobias | 523/409 |
| 4,374,875 | 2/1983 | Fan | 523/423 |
| 4,383,059 | 5/1983 | Brook et al. | 525/107 |
| 4,399,241 | 8/1983 | Ting et al. | 523/400 |

FOREIGN PATENT DOCUMENTS 6334 11/1979 European Pat. Off. .
6336 11/1979 European Pat. Off. .

Primary Examiner—Ronald W. Griffin
Attorney, Agent, or Firm—Alexander J. McKillop; Michael G. Gilman; Edward J. Trojnar

[57] ABSTRACT

An improved process for preparing epoxy acrylate dispersions from the reaction product of an epoxy resin and carboxyl containing polymer in the presence of tertiary amine in which the carboxyl containing polymer is formed, in situ, in the presence of a solvent solution of the epoxy resin and then subjected to the esterification reaction which can be conducted in a single pot.

15 Claims, No Drawings

PROCESS FOR PREPARING AQUEOUS COATINGS COMPRISING DISPERSIBLE EPOXY RESIN-ACID POLYMER ESTER

CROSS REFERENCE TO RELATED APPLICATIONS

An essential step in the process of this invention is the reaction of an epoxy resin containing 1,2-epoxy groups, and acid containing polymer. Suitable epoxy resins and acid containing polymers, as well as reaction conditions, are disclosed in the following applications which are incorporated herein by reference in entirety: U.S. application Ser. No. 249,795, filed Apr. 1, 1981; U.S. application Ser. No. 221,641, filed Dec. 31, 1980, now abandoned; and U.S. application Ser. No. 378,314, filed May 14, 1982. Disclosure of ionic polymers also appears in published European application Nos. 6334 and 6336 both published Jan. 9, 1980. European application No. 6336 and aforementioned Ser. No. 249,795 are based on the same U.S. priority application (Ser. No. 914,472 filed June 12, 1978 ,now abandoned). European application No. 6334 and aforementioned applications, Ser. Nos. 221,641 and 378,314, are based on the same U.S. priority application (Ser. No. 914,471, filed June 12, 1978.)

A concurrently filed application by S. Chu and A. T. Spencer Ser. No. 454,818, filed Dec. 30, 1982 entitled "AQUEOUS COATINGS COMPRISING DISPERSIBLE EPOXY RESIN—ACID POLYMER ESTER AND DILUENT POLYMER AND METHOD OF PREPARATION" discloses similar compositions prepared by a different method.

BACKGROUND OF THE INVENTION

A variety of processes for preparing aqueous coating compositions comprising epoxy resin and acrylic polymer are known in the art and several such compositions are commercially available. In order to obtain desirable characteristics for many critical end use applications, such as coatings for sanitary cans, it is considered necessary to include a high proportion of epoxy resin in the composition. Epoxy contents of 60 to 80 percent are commonly used. Typical epoxy acrylate compositions are disclosed in U.S. Pat. No. 4,247,439 to Matthews and Sommerfield; U.S. Pat. Nos. 4,212,781 and 4,308,185 to Evans and Ting; and U.S. Pat. No. 4,302,373 to Steinmetz; all of which are incorporated herein by reference.

U.S. Pat. No. 4,285,847 to Ting discloses epoxy acrylate compositions in which the epoxy acrylate is made by grafting ionizable side chains onto an epoxy backbone; dispersing this product in water and thereafter polymerizing, in situ, addition polymerizable monomers which may or may not also contain ionizable groups. By this means the solids content of the composition is increased and the proportion of total epoxy resin in the composition is reduced by replacement with the cheaper addition polymer thereby reducing the cost of the composition.

BRIEF DESCRIPTION OF THE INVENTION

The present invention relates to an improved process for preparing aqueous coating compositions comprising the neutralized water-dispersible product containing ester groups which is the reaction product of an epoxy resin and an acid polymer, which can be conducted in "one pot" or reactor.

The process involves the steps of copolymerizing a monomer mixture which includes at least 30 percent by weight of carboxyl-containing monomer to form a carboxyl containing copolymer in the presence of an epoxy resin containing aliphatic carbon atoms and 1,2-epoxy groups in which said epoxy resin constitutes at least 40 weight percent of the solids in the resulting composition;

reacting the composition so obtained under esterification conditions in the presence of a tertiary amine esterification catalyst wherein the equivalents of 1,2-epoxy groups in said epoxy resin are in excess of the equivalents of tertiary amine, to obtain a product substantially free of epoxy groups and containing hydroxy ester groups from the reaction between the carboxyl groups and at least 5 percent of said 1,2-epoxy groups; and dispersing the composition in water with the addition of ammonia or amine neutralizing agent.

DETAILED DESCRIPTION OF THE INVENTION

The first step in the process of this invention is the polymerization of a carboxyl containing monomer in the presence of an epoxy resin to give a mixture of the epoxy resin and carboxyl containing copolymer. This reaction is a conventional addition polymerization reaction utilizing catalysts and procedures which are well known. For example, the methods disclosed in U.S. Pat. No. 4,212,781 are suitable in which case the resulting mixture presumably also contains carboxyl polymer grafted to aliphatic carbonations on the epoxy backbone. However, grafting while acceptable herein is not necessary. Accordingly, polymerization conditions less stringent than desired in said patent can be used to obtain a copolymer without any epoxy graft product.

Once the carboxyl containing copolymer is formed the methods disclosed in the copending applications cross referenced and incorporated by reference above or the procedures described in U.S. Pat. No. 4,247,439 to Matthews and Sommerfield or U.S. Pat. No. 4,302,373 to Steinmetz both of which are also incorporated by reference can be used to conduct the reaction between the epoxy resin and the carboxyl group. It is essential, however, to modify conditions in some instances to promote esterification instead of quaternization, for example by using tertiary amine in an amount which is less than sufficient to react with all of the epoxy groups on the epoxy resin.

Briefly, the methods disclosed in the copending applications and the issued patents involve the reaction of an epoxy resin containing 1,2-epoxy groups with a preformed addition polymer containing carboxyl groups in the presence of a tertiary amine. In the copending applications the conditions are chosen so that an esterification reaction occurs between the epoxy groups of the epoxy resin and the carboxyl groups of the addition polymer. Reaction conditions in the aforementioned patents are selected in order to promote a reaction between the tertiary amine and epoxy groups giving quaternary ammonium groups in accordance with a well known reaction. It is believed that the reaction which is intended to promote esterification also results in the formation of significant amounts of quaternary ammonium groups by reaction between the epoxy groups and the tertiary amine. Indeed, more of the epoxy groups may be converted to quaternary ammonium groups than are converted to hydroxy ester linkages. Also, the reaction described in the issued patents intended to produce quaternary ammonium groups can, under appropriate conditions, result in significant ester formation. The products prepared in accordance with the process of the present invention therefore can contain significant, even predominant amounts of quaternary groups, providing that hydroxy ester groups obtained by the reaction of epoxy groups with carboxyl groups are also present. At a minimum at least about 5 percent of the epoxy groups on the epoxy resin should be converted to hydroxy ester groups. Whatever the relative proportions of quaternary and hydroxy ester groups are the polymer is ionic in character and is reacted so that the ionic polymer product is substantially free of unreacted 1,2-epoxy groups.

In general, the epoxy resin constitutes at least about 40 percent of the ionic polymer and the carboxyl containing polymer comprises the balance. Preferably the epoxy content is at least 60 percent and most preferably about 75 percent.

The present invention is operable with a variety of epoxy resins. However, the epoxy resins which are preferred are aromatic polyethers, particularly those derived from the condensation of a bisphenol such as Bisphenol A, and epichlorohydrin. These epoxy resins possess hydroxy groups in addition to epoxy groups. The higher the molecular weight of the epoxy resin the more hydroxy groups are present. These hydroxy groups can participate in the final curing reaction. The preferred epoxy resins are aromatic polyethers having a number average molecular weight ($M_n$) of at least about 1,500. However, the number average molecular weight of these resins can vary from about 350 to 6000.

As recognized in the art, epoxy resins prepared by the condensation of bisphenols and epichlorohydrin contain a mixture of diepoxides, monoepoxides and aromatic polyethers which are free of epoxy groups. The average functionality of such mixtures may range widely from about 0.2 epoxy groups per molecule to nearly 2 epoxy groups per molecule. Suitable mixtures of epoxy resins can be obtained by reacting a lower molecular weight epoxy resin having a functionality of between 1 and 2, for example, with a defunctionalizing agent which is capable of reacting with the epoxy groups. The defunctionalizing agent can contain carboxyl groups, hydroxy groups or amide groups, for example. Specific suitable materials include acids such as benzoic acid and fatty acids such as octanoic acid; hydroxy compounds such as phenols, in particular bisphenols and lower alkanols; and amides such as acrylamide. Defunctionalization with bisphenols is of particular interest since the epoxy resin is thereby upgraded to higher molecular weight at the same time as some of the epoxy groups are defunctionalized.

The carboxyl polymer is prepared by the addition polymerization of ethylenically unsaturated monomers comprising at least about 20 percent of an ethylenically unsaturated carboxylic acid based on the total weight of the monomers. Polymers and copolymers of this type are well known although the copolymers with particularly high proportions of carboxylic acid as preferred herein are somewhat unusual. Preferably the carboxyl containing polymer is a copolymer with ethylenically unsaturated monomers which are non-reactive under the contemplated conditions of polymerization and reaction with epoxy resin. However, small amounts of reactive monomers, e.g., hydroxy monomers such as 2-hydroxy ethylmethacrylate, amide monomers such as acrylamide, and N-methylol monomers such as N-methylol acrylamide, can be used. Suitable non-reactive monomers are, for example, acrylate and methacrylate esters such as ethyl acrylate, methyl acrylate, butyl acrylate, styrene or vinyl toluene, vinyl acetate, vinyl chloride, vinylidine chloride, acrylonitrile, and the like. The function of these monomers is to enhance solvent solubility and to provide good film formation. Otherwise the nature and proportions are not critical to this invention.

The presence of a large proportion of carboxyl functional monomer is essential. The preferred minimum proportion of carboxyl monomer is 30 percent of the weight of the monomers used to prepare the carboxyl containing polymer. Methacrylic acid provides the best hydrolytic stability and is very much preferred, but other acids such as fumaric acid, acrylic acid, crotonic acid and itaconic acid and the like are useful. Up to about 80 percent of the monomers can be carboxyl functional, the maximum being determined by retention of solvent solubility of the copolymer.

The preferred polymers containing carboxyl groups generally having number average molecular weight ($M_n$) in the range of 3000 to 20,000 preferably 3,000 to 6,000. Molecular weight can be controlled by monomer content during polymerization, catalyst concentration and polymerization temperature in the known manner. Mercaptan chain termination is preferably avoided especially where the product is intended for use in coating of sanitary cans because of the offensive odor of mercaptans.

Generally, the addition polymer containing carboxyl groups is reacted with the epoxy resin as a solvent solution in the presence of sufficient amine, preferably tertiary amine to promote the reaction. The preferred esterification catalysts are tertiary amines particularly, dimethylaminoethanol but other esterification catalysts particularly tertiary amines such as dimethylbenzylamine, triethylamine, and tributylamine can be used. The amount of catalyst used can vary widely. For example, where a tertiary amine is used as little as 0.1–0.3 percent by weight of the catalyst based on the total amount of epoxy resin and carboxyl containing polymer can be used or the amount can be much larger up to about 10 percent and more of the reactants.

Another way of defining the amount of amine used is the relation to the total carboxyl content of the acid polymer. The amount of amine present during the reaction of the epoxy resin and carboxyl polymer will be sufficient to neutralize from about 5 to about 50 percent of the carboxyl groups in the acid polymer. Preferably, the amine is sufficient to neutralize between about 10 and about 35 percent of the carboxyl groups. Still another way of defining the amount of tertiary amine present during reaction of the epoxy resin and carboxyl polymer is by the equivalent ratio of amine to 1,2-epoxy groups. Preferably, this ratio is less than one thereby ensuring that some of the epoxy groups will be consumed in hydroxy ester formation by reaction with carboxyl group.

The amount of amine has a significant effect on the nature of the product of the reaction. In general, the smaller the amount of amine present during reaction the higher the viscosity of the product. This difference in viscosity is apparent in both the solvent solution and when the product is emulsified in water. The effect of the amount of amine used is observed even where the total amount of amine present in the dispersed product is identical. Thus, for example, the same product is not obtained when amine is present at the 40 percent neutralization level during reaction as when amine sufficient to neutralize 5 percent of the carboxyl groups is present during reaction and supplemented with 35 percent of the neutralization amount prior to dispersion in water.

The amount of amine present during reaction also has a pronounced effect on the particle size of the final dispersion.

A second polymer different from the addition polymer used to prepare the ionic epoxy resin-acid polymer product can be prepared from a wide variety of unsaturated monomers and introduced into the composition. Particularly preferred are monomers which are free of functional groups reactive with epoxy resin or which would render the polymer self-dispersible in water. For example there may be mentioned the esters of acrylic and methacrylic acid such as methyl acrylate, butyl acrylate, methyl methacrylate and butyl methacrylate; aromatic monomers such as styrene and methylstyrene; vinyl and vinylidene halides such as vinyl chloride and vinylidene chloride; isoprene; butadiene and the like. In certain applications it may be advantageous to include in the copolymer self-crosslinking monomers such as N-methylol acrylamide or N-isobutoxy acrylamide. Presently preferred monomers include styrene, methylstyrene and butyl acrylate.

The second polymer can be introduced at any convenient stage of the reaction. Preferably, the second polymer is prepared, in situ, in the presence of an aqueous dispersion of the ionic epoxy-acidic polymer reaction product. The reaction is conducted in the known manner. Advantageously, the reaction is initiated by a redox system. Inorganic or organic peroxide such as hydrogen peroxide; or persulfates such as ammonium persulfate and alkali metal persulfates can be coupled with a suitable reducing agent such as hydrazine, alkali metal sulfites bisulfites, metabisulfites or hydrosulfites. The procedures disclosed in U.S. Pat. No. 4,285,847 which is incorporated by reference herein are suitable for conducting the polymerization.

The second polymer can also be introduced as a performed polymer into either the aqueous dispersion of the ionic epoxy-acid polymer product or can be mixed with the ionic epoxy resin-acid polymer product before it is dispersed in water. Similarly, the second polymer can be mixed with a solvent solution of the acidic polymer prior to its reaction with the epoxy resin either by making the addition polymers separately or by preparing one in the presence of the other. The second polymer can also be prepared, in situ, in the presence of the epoxy resin either before or after the polymerization of the carboxyl containing polymer has been conducted and either before or after reaction of the carboxyl containing polymer and epoxy resin has taken place.

The proportion of the second polymer in the composition can vary widely. The maximum is limited by the amount which can be stably dispersed in water by the ionic polymer component and the retention of desired film properties. Usually the weight ratio of the second addition polymer (B) to the ionic polymer (A) is from 0.05:1 to 10:1 but more preferably is 0.2:1 to 5:1.

The resins used in preparing the compositions of this invention are used by dissolution in a volatile organic solvent. A wide variety of solvents are suitable. Organic solvents of limited water miscibility, such as xylene, toluene, butanol and 2-butoxyethanol are useful, and they may be used alone or together with water miscible solvents, such as 2-ethoxyethanol or methyl ethyl ketone.

The final composition includes sufficient ammonia or amine to render the mixture self-dispersible in water. Preferably, a tertiary amine such as dimethylethanol amine is used. In general, the total amount of an amine or an ammonia present in the final product will be sufficient to neutralize at least about 25 to about 90 percent of the carboxyl groups present in the polymers used to prepare their composition. Finally, compositions, as used, preferably include a curing agent such as an aminoplast or a phenoplast resin in an amount of 1 to 25 percent, preferably from 3 to 10 percent, based on the solids of the composition.

Although the present invention has been described in detail, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for preparing an aqueous dispersion composition comprising:
    A. copolymerizing a monomer mixture which includes at least 30 percent by weight of carboxyl-containing monomer to form a carboxyl containing copolymer in the presence of an epoxy resin containing aliphatic carbon atoms and 1,2-epoxy groups in which said epoxy resin constitutes at least 40 weight percent of the solids in the resulting composition;
    B. reacting the composition obtained in A under esterification conditions in the presence of a tertiary amine esterification catalyst wherein the equivalents of 1,2-epoxy groups in said epoxy resin are in excess of the equivalents of tertiary amine, to obtain a product substantially free of epoxy groups and containing hydroxy ester groups from the reaction between said carboxyl group and at least 5 percent of said 1,2-epoxy groups; and
    C. dispersing said composition in water with the addition of ammonia or amine neutralizing agent; in which a polymer different from said carboxyl containing copolymer of step A is prepared in situ prior to dispersing the mixture in water in step C.

2. The process of claim 1 in which said different polymer is substantially free of carboxylic acid groups.

3. The process of claim 1 in which said different polymer is a copolymer of styrene and butyl acrylate.

4. The process of claim 1 in which said carboxyl containing monomer is methacrylic acid.

5. The process of claim 1 in which said carboxyl containing copolymer is a copolymer of ethyl acrylate, styrene and methacrylate acid.

6. The process of claim 1 in which said epoxy resin is an epichlorohyrin-bisphenol A epoxy resin.

7. The process of claim 1 in which said tertiary amine and said neutralizing agent are dimethylaminoethanol.

8. The process of claim 1 in which said copolymerization in step A is conducted under conditions which result in grafting of said carboxyl containing copolymer to aliphatic carbon atoms on said epoxy resin.

9. The process of claim 1 in which copolymerization in step A is conducted under conditions which result in substantially no grafting of said carboxyl containing polymer to aliphatic carbon atoms on said epoxy resin.

10. The process of claim 1 in which said epoxy resin is an epichlorohydrin-bisphenol A epoxy resin; said carboxyl containing copolymer is a copolymer of ethyl acrylate, styrene and methacrylate acid; said tertiary amine and said neutralizing agent are dimethylaminoethanol.

11. The process of claim 10 in which the weight ratio of said epoxy resin to said carboxyl polymer is at least 1:1.

12. The process of claim 10 in which the weight ratio of said epoxy resin to said carboxyl polymer is at least 2:1.

13. The process of claim 10 in which the weight ratio of said epoxy resin to said carboxyl polymer is at least 3:1.

14. The process of claim 10 in which said copolymerization in step A is conducted under conditions which result in grafting of said carboxyl containing copolymer to aliphatic carbon atoms on said epoxy resin.

15. The process of claim 10 in which copolymerization in step A is conducted under conditions which result in substantially no grafting of said carboxyl containing polymer to aliphatic carbon atoms on said epoxy resin.

* * * * *